United States Patent
Muellner

(10) Patent No.: US 7,054,402 B2
(45) Date of Patent: May 30, 2006

(54) DATA REGENERATOR WITH ADJUSTABLE DECISION THRESHOLD AND ADJUSTABLE SAMPLING INSTANT

(75) Inventor: Ernst Muellner, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 452 days.

(21) Appl. No.: 10/137,975

(22) Filed: May 3, 2002

(65) Prior Publication Data

US 2002/0184564 A1    Dec. 5, 2002

(30) Foreign Application Priority Data

May 4, 2001    (DE) .................... 101 21 757

(51) Int. Cl.
 *H04L 7/00* (2006.01)
 *H04L 25/00* (2006.01)
 *H04L 27/06* (2006.01)
(52) U.S. Cl. .................. 375/355; 375/371; 375/340
(58) Field of Classification Search ............. 375/340, 375/316, 317, 371, 355, 354, 373, 375, 376; 327/141, 155, 156, 158, 159, 144–147, 149, 327/150

See application file for complete search history.

(56) References Cited

U.S. PATENT DOCUMENTS

| | | | | |
|---|---|---|---|---|
| 4,780,889 A | * | 10/1988 | Ley et al. | 375/355 |
| 4,823,360 A | * | 4/1989 | Tremblay et al. | 375/214 |
| 5,295,155 A | * | 3/1994 | Gersbach et al. | 375/214 |
| 6,347,128 B1 | * | 2/2002 | Ransijn | 375/376 |
| 6,496,555 B1 | * | 12/2002 | Soda | 375/376 |
| 6,519,302 B1 | * | 2/2003 | Bruce et al. | 375/355 |
| 6,577,696 B1 | * | 6/2003 | Burgmeier et al. | 375/376 |
| 6,580,763 B1 | * | 6/2003 | Mullner et al. | 375/316 |

FOREIGN PATENT DOCUMENTS

| | | |
|---|---|---|
| DE | 197 17 642 | 11/1998 |
| DE | 197 17 643 | 11/1998 |

* cited by examiner

*Primary Examiner*—Tesfaldet Bocure
(74) *Attorney, Agent, or Firm*—Bell, Boyd & Lloyd LLC

(57) ABSTRACT

A data regenerator is provided which contains a clock regenerator which includes a phase comparator and a clock generator and obtains a sampling clock signal from an input signal, and two sampling devices, a measurement and a sampling device. In both sampling devices, it is possible to adjust the decision threshold and the sampling instants separately. The function of the clock regenerator is not impaired as a result of this. The bit-by-bit comparison of the sampled binary signals yields comparison values which are fed to a controller. The controller determines the optimum decision threshold and the optimum sampling instant from the comparison values.

7 Claims, 6 Drawing Sheets

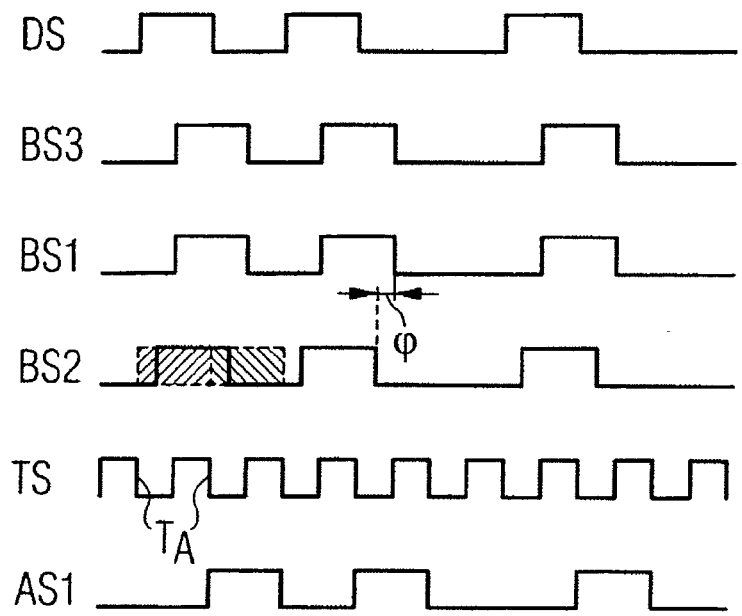
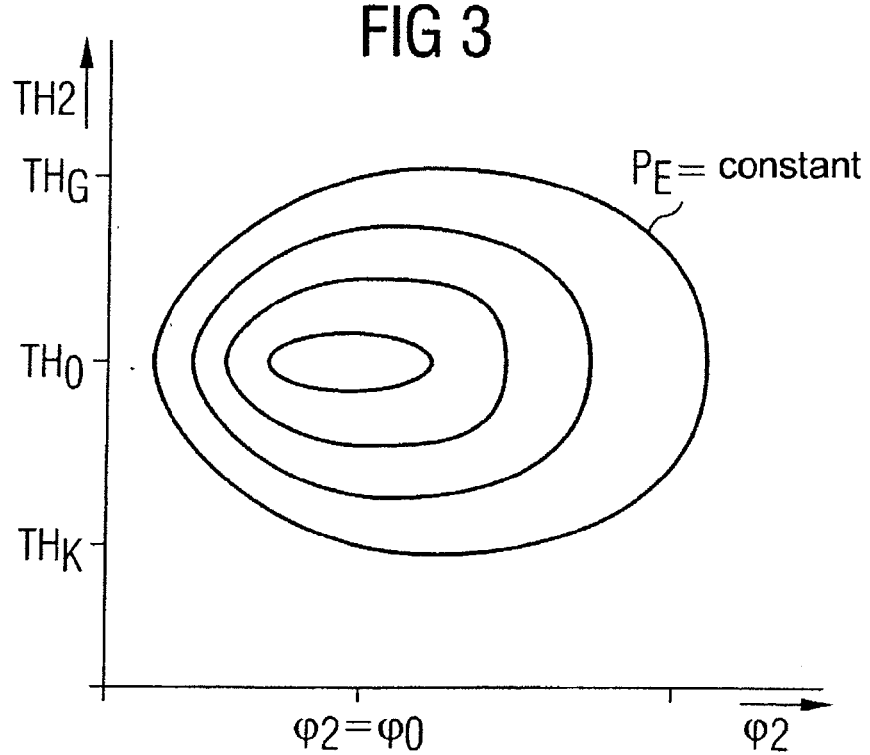

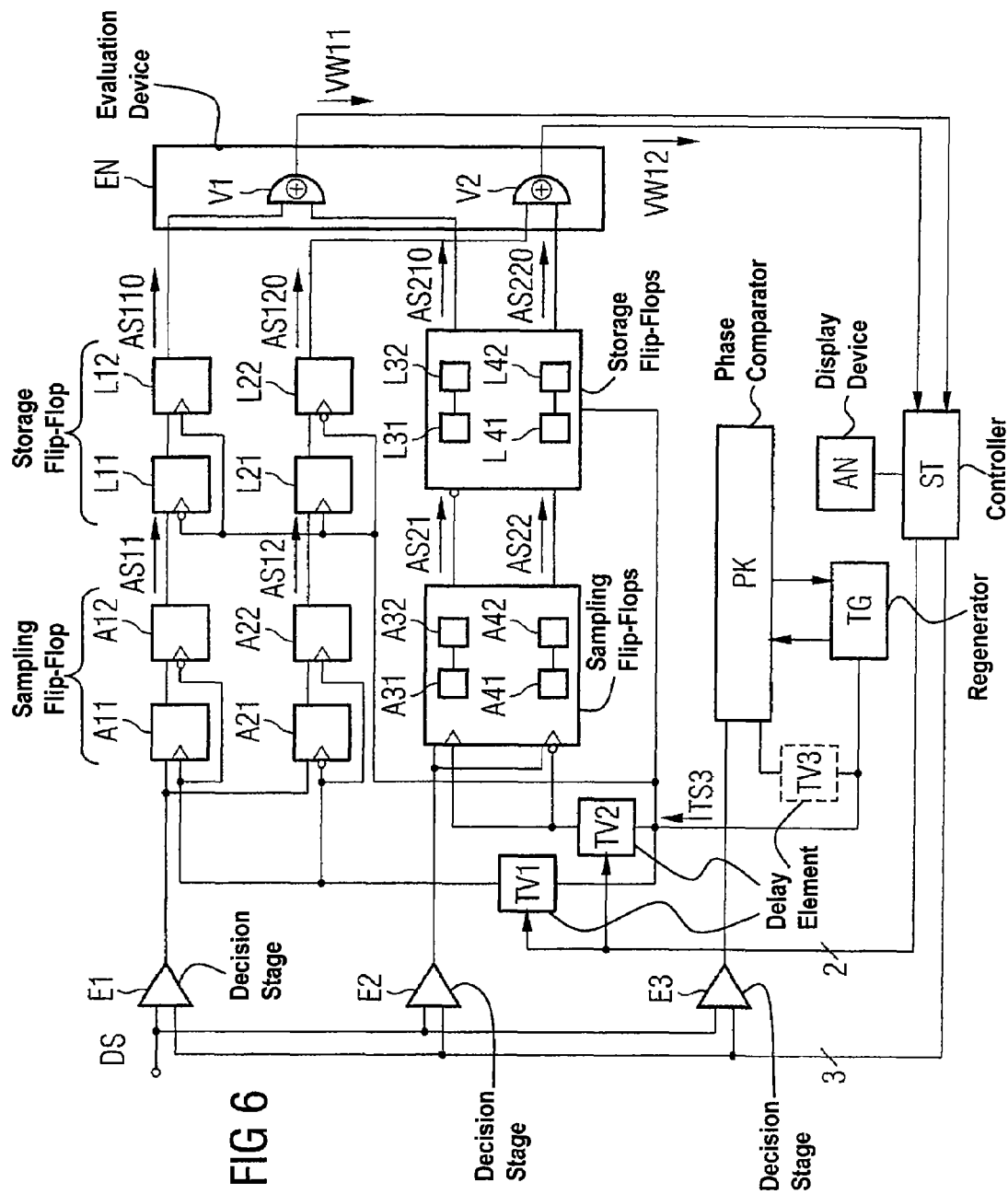

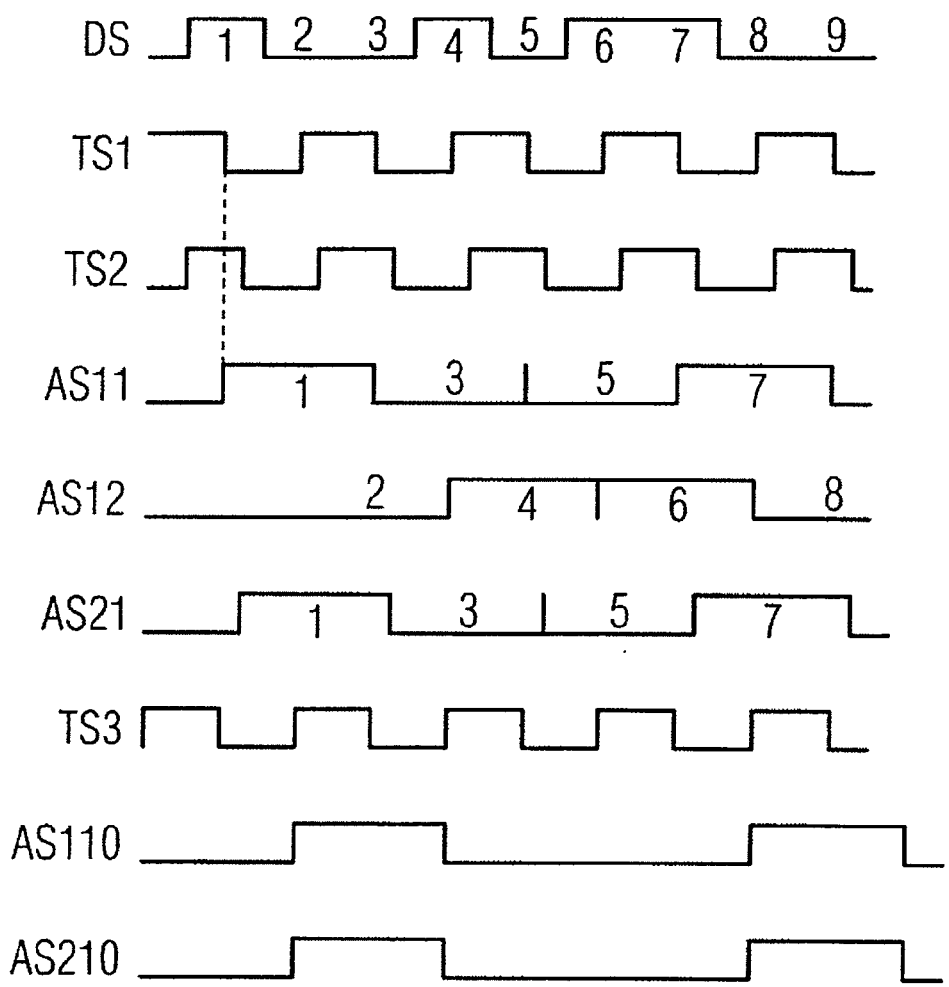

DATA REGENERATOR WITH ADJUSTABLE DECISION THRESHOLD AND ADJUSTABLE SAMPLING INSTANT

BACKGROUND OF THE INVENTION

In transmission systems with high bit rates, the decision threshold (sampling threshold) and the sampling instant of a transmitted signal substantially determines the error rate and, hence, the maximum transmission range. The optimum decision threshold, that is to say the threshold for distinguishing between the two states of the binary signal, and the optimum sampling instant, that is to say the phase angle of a sampling clock signal relative to the bit center of a data signal, are dependent on the transmission device and the transmission link. During operation, both are intended to be readjusted without interfering with the transmission.

The published German patent application DE 191 77 643 A1 describes a method and an arrangement for regulating the decision threshold and the sampling instant of a data regenerator. The latter has a first data path with a phase comparator and a second data path, the decision thresholds in the two data paths being able to be set independently of one another. As a result of this, the decision threshold can be optimized at a predetermined sampling instant. In order to determine the entire reception eye, however, the sampling instant has to be shifted. This is only possible jointly for both data paths, as a result of which the reception quality is impaired in the event of relatively large deviations from the ideal sampling instant. Moreover, the reference with respect to the ideal phase angle is easily lost in the event of relatively large phase deviations and non-ideal transmission conditions.

The published German patent application DE 197 17 642 A1 describes a data regenerator having only one data path with an adjustable decision threshold and an adjustable sampling instant. The phase comparator is independent of the setting of the sampling instant. This data regenerator is preferably used in systems which transmit data protected by error-correcting codes, as a result of which the impairment of the signal quality, through alteration of the sampling conditions, is eliminated or alleviated by the error correction. However, this arrangement is not suitable for the measurement of the entire reception eye and in the case of transparent transmission.

In the case of optimization of the sampling, it must be taken into account, moreover, that the decision threshold and the sampling instant influence one another.

It is an object of the present invention, therefore, to specify data regenerators for transparent transmission systems in which the decision threshold and the sampling instant can be set optimally.

SUMMARY OF THE INVENTION

Accordingly, what is particularly advantageous in the case of the data regenerator of the present invention is that the setting of the phase always can be based on an approximately optimum reference point which is prescribed by the phase comparator. The decision threshold and the sampling instant of the measurement sampling device can be altered arbitrarily, without interference with the data reception occurring owing to the unaltered threshold of the operating sampling device.

In an advantageousembodiment of the present invention, the decision threshold and the phase of the phase comparator also can be optimized. This data path is then used as the operating sampling device. The two sampling devices then can be altered arbitrarily for measurement purposes, without interference with the reception. Thus, with constant decision thresholds, the entire reception eye can be traversed or, with a constant sampling instant, the decision thresholds can be varied arbitrarily. The influences of the decision threshold and of the sampling instant can be determined independently of one another without interfering with the data transmission. On the basis of the measurement results, it is possible, in turn, to set an optimum sampling phase and equally the decision threshold. This variant is particularly suitable for a soft decision error correction since, in the case of a decision logic augmented with little outlay, after optimization of the sampling conditions, the reception signal can be assessed with three different decision thresholds.

In a further variant, which is particularly suitable for extremely high data rates or for measurement purposes, each sampling device has two data paths in which the bits of the binary signal are written alternately. As a result of this, measurements are possible in the case of phase changes up to ±half the bit width from the desired sampling instant and the further processing of the samples is non critical.

Additional features and advantages of the present invention are described in, and will be apparent from, the following Detailed Description of the Invention and the Figures.

BRIEF DESCRIPTION OF THE FIGURES

FIG. 2 shows a diagram for optimization of the decision threshold.

FIG. 3 shows an error rate diagram for optimization of decision threshold and clock phase.

FIG. 6 shows a further variant of the data regenerator with parallel data paths.

FIG. 7 shows a timing diagram for elucidating the function of the data regenerator.

DETAILED DESCRIPTION OF THE INVENTION

Figure 1:
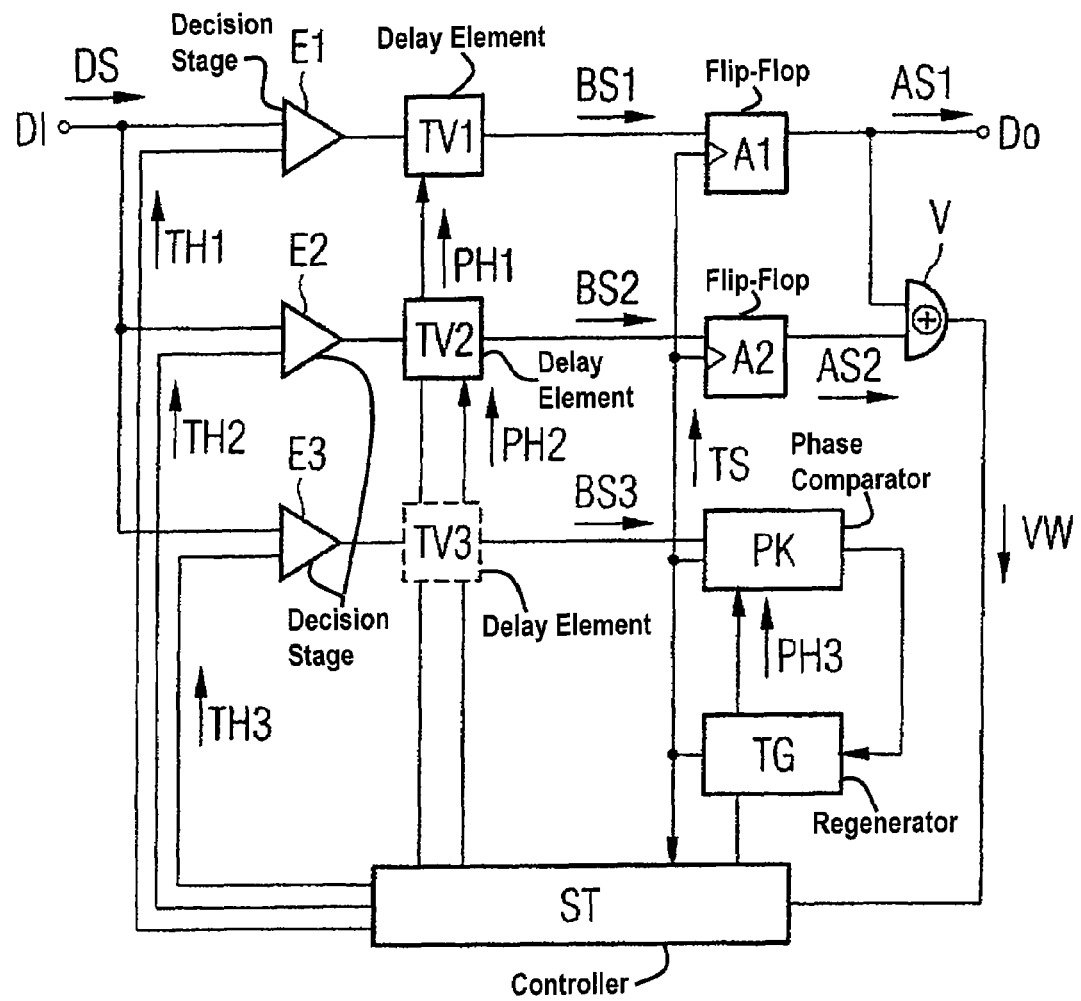
FIG. 1 shows a data regenerator according to the present invention.

The data regenerator illustrated in FIG. 1 has a phase-locked loop PK, TG and two sampling devices E1, TV1, A1 and E2, TV2, A2. The first sampling device contains a first decision stage E1, a first adjustable delay element TV1 and a first sampling stage A1. Correspondingly, the second sampling device contains a second decision stage E2, a second adjustable delay element TV2 and a second sampling stage A2. The outputs of the sampling stages A1 and A2 are connected to the inputs of a comparison stage V, an exclusive-OR gate. Moreover, there is connected upstream of the data input of the phase comparator PK a third decision stage E3 and, if necessary, a (if appropriate adjustable) delay element TV3.

A binary input signal DS present at the data input DI is fed to the two sampling devices and the phase comparator. This signal is, in each case, compared with a comparison voltage, which is present at the decision stages and corresponds to the decision threshold TH1, TH2 and TH3, respectively, and converted into an as-far-as-possible square-wave binary signal. After passing through the delay elements, the binary signals BS1 and BS2, respectively, are latched (written to the sampling flip-flops) with a clock signal TS and buffer-stored by the sampling flip-flops A1, A2 as sampled binary signals AS1 and AS2. The clock regenerator PK, TG obtains the sampling clock signal TS from the input signal DS. The decision thresholds and the delay elements are set by a controller ST. The latter receives comparison values VW, which correspond to "errors", from the output of the comparison stage V and determines from these comparison values criteria for the optimum setting of the decision thresholds and of the delay elements which determine the sampling instants ("sampling phases"). In principle, it is possible also to interpose the delay elements between clock generator and sampling stages and, thus, to delay the clock signal instead of the input signal. However, delaying the binary signals enables the assessment of the comparison values always with the same clock signal independently of the sampling instant.

FIG. 2 shows a timing diagram for elucidating the function. The binary input signal DS is delayed by half a bit by the delay element TV3 and is sampled as binary signal BS3 by the phase comparator with the negative edge of the clock signal TS, ideally in the center. Given optimum sampling, the binary signals BS1 and BS2 likewise are delayed approximately by half a bit. In the example illustrated in FIG. 2, the delay in the measurement sampling device E2, TV2, A2 is shorter, however, so that the second binary signal BS2 leads relative to the clock signal TS, as a result of which it is not sampled ideally and more incorrect samplings ("errors") therefore occur. The permissible range of fluctuation of the second binary signal BS2 (or of the sampling instants $T_A$) of $\pm\frac{1}{2}$ bit is shown hatched. The first binary signal BS1 likewise is delayed by half a data bit and corresponds to the third binary signal. The binary signal which is ideally sampled in the center is designated AS1, and the sampled binary signal AS2 is not illustrated in FIG. 2.

Due to component delays and characteristics of the transmission device, the phase comparator will not usually effect ideal sampling. Therefore, optimization of the sampling by the first sampling device, the operating sample device E1, TV1, A1, is necessary. In this way, an optimally sampled binary signal AS1 is output at the operating data output DO.

The decision thresholds and the sampling instants (more precisely, the phase between the data or binary signal and the clock signal) are set by the corresponding control signals TH1, TH2 and PH1, PH2, respectively. In this exemplary embodiment, the decision threshold of the clock regenerator also can be set via a variable decision threshold TH3.

The phase comparator also can be designed for many applications such that the delay element TV3 can be obviated, by using an inverted clock signal, for example. The sampling phase of the phase comparator can be optimized via a special phase setting signal PH3.

FIG. 3 shows a sampling diagram as a function of the sampling phase and the decision threshold. The initial assumption is an optimum decision threshold $TH_0$ and sampling phase $\phi_0$ for the operating sampling device E1, TV1, A1. First of all the error rates, more precisely the unequal comparison values, are measured in a manner dependent on the sampling phase $\phi_2$ of the measurement sampling device. The "error rate" rises in the event of relatively large deviations of the sampling phase. Given an optimum reference decision threshold $TH1=TH_0$ and, in each case, different thresholds TH2, the sampling phase $\phi_2$ of the measurement sampling device E2, TV2, A2 is varied again, thereby producing the diagram illustrated. Equally, with the sampling phase kept constant in each case, it is also possible for the threshold value to be varied and for the operation subsequently to be repeated in the case of a new measurement with a changed sampling phase. The closed graphs depicted correspond to constant error rates $P_E$ and they increase outward with the deviation from the ideal values. The diagram illustrated shows an asymmetrical behavior. This asymmetry and the phase fluctuations that occur in the data input signal must be taken into account in the determination of the optimum sampling phases $\phi_0$. Corresponding diagrams also can be determined for larger decision thresholds $TH1=TH_G$ or smaller decision thresholds $TH1=TH_K$. However, these diagrams also have a greatly asymmetrical form with regard to the TH1 decision threshold, so that the optimum threshold likewise can be determined from them.

The corresponding algorithm can be derived from the published patent application DE 19914793 and is not part of the present invention.

Figure 4:
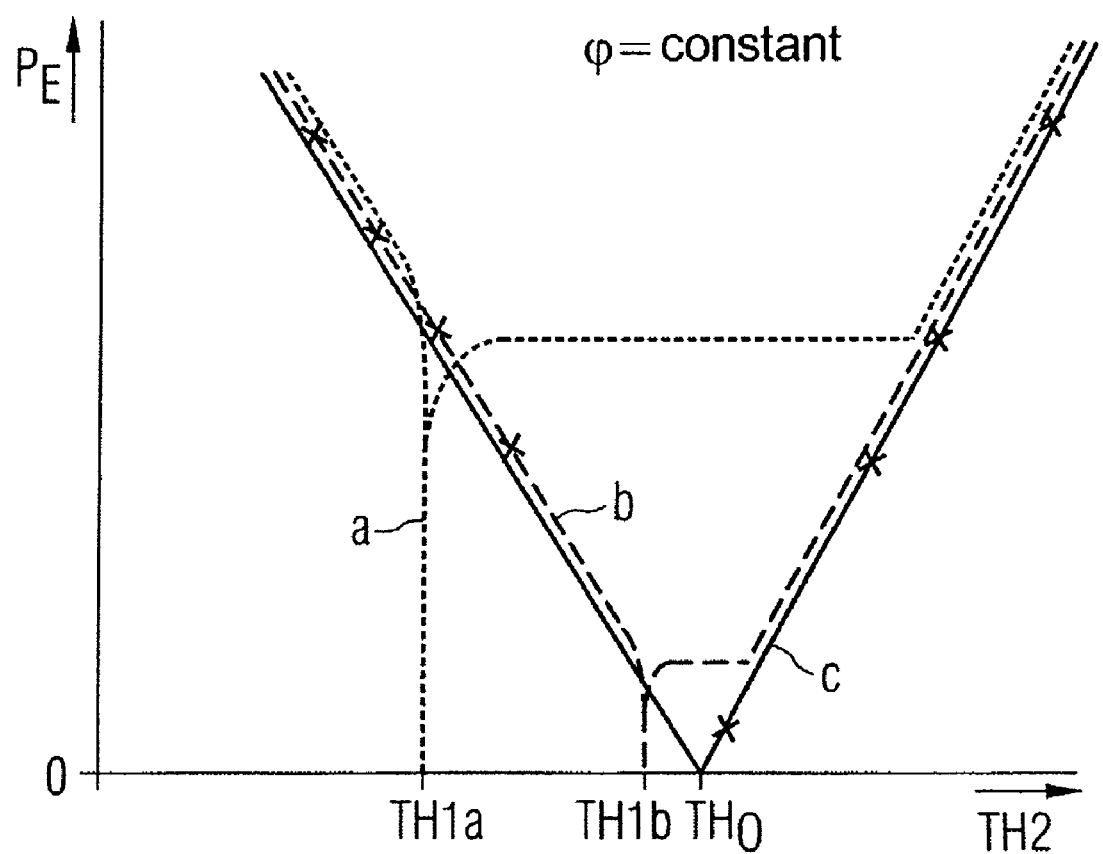
FIG. 4 shows a further error rate diagram.

FIG. 4 shows a further illustration of the relationship between thresholds and error rates. The error rates $P_E$ are illustrated (logarithmic scale) as a function of the threshold value TH2. The threshold value TH1 is altered for each measurement series, while the sampling phase remains constant. In case a, dotted function, in which there is a considerable deviation of the threshold $TH1=TH1a$ from the optimum value $TH_0$, upon approximation of the threshold TH2 to TH1a there is only a narrow minimum at which the measured error rate (comparison values) is zero. The error rate then remains at a high level, however, upon further shifting of the threshold TH2 in the direction of the desired value $TH_0$, because the sampling device E1, TV1, A1, with the threshold TH1a kept constant, now produces the errors until the curve rises again with a further increase in the difference in the decision thresholds on the basis of the errors produced by the second, the measurement sampling device E2, TV2, A2. In case b, dashed function, in which the reference threshold $TH1=TH1b$ lies closer to the optimum, the horizontal function profile is significantly shorter and an extrapolation is, thus, more reliable. The solid curve represents the profile in the case of an optimized reference decision threshold $TH1=TH_0$.

Figure 5:
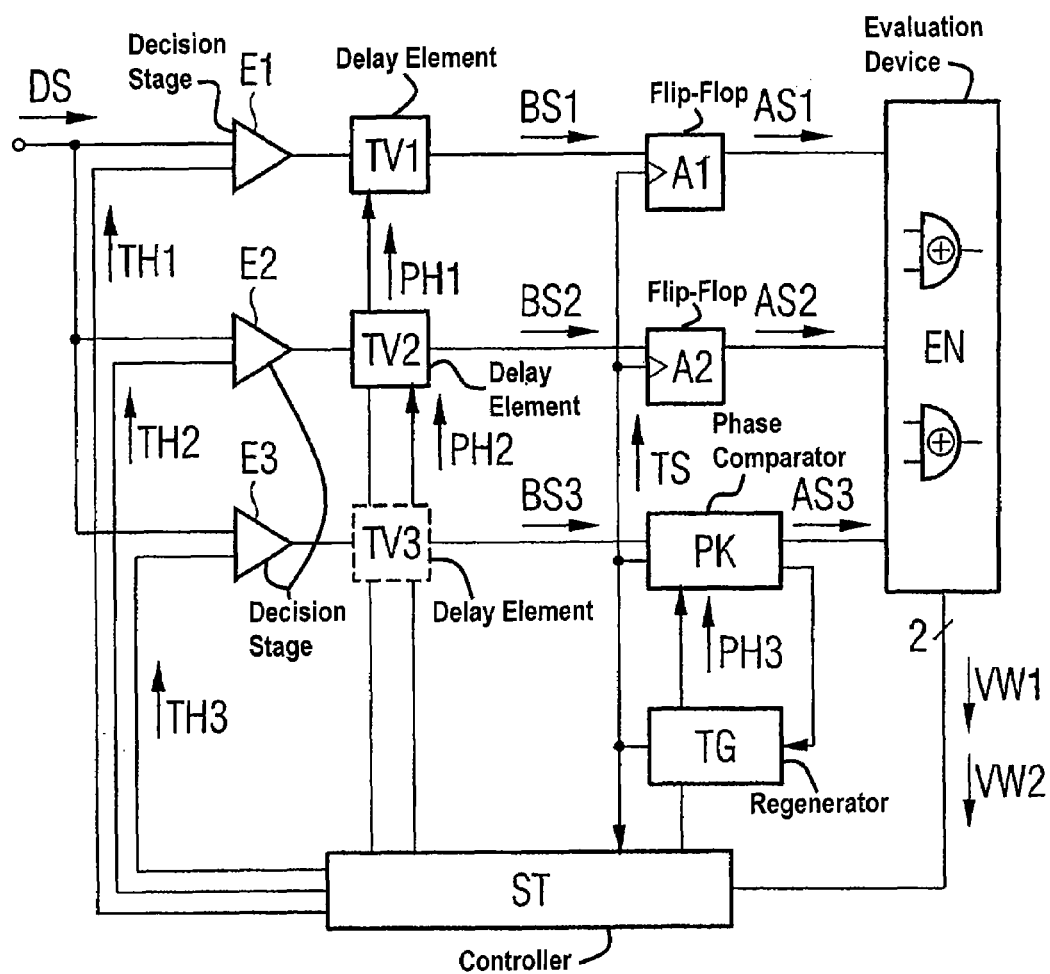
FIG. 5 shows a particularly advantageous variant of the data regenerator.

FIG. 5 illustrates a particularly advantageous variant of the data regenerator, in which the decision threshold and the sampling phase of the clock regenerator also can be set optimally and the latter outputs a sampled binary signal AS3 synchronously with the others and is, therefore, used as a working (reference) sample device. Since the sampling phase and the sampling threshold of the clock regenerator only have to be varied slightly, there is always a good output value present for an optimization. The sampling thresholds and the sampling instants also can be arbitrarily varied simultaneously in the case of the first two sampling devices E1, TV1, A1 and E2, TV2, A2, without interference with the data transmission. This also enables simultaneous measurements with different threshold values TH1, TH2 or sampling phases. The corresponding samples AS1, AS2, AS3 are fed to a corresponding evaluation device EN, which outputs two comparison values VW1, VW2.

Furthermore, after the determination of the optimum decision threshold and of the optimum sampling instant of the clock regenerator, the decision thresholds TH1 and TH2 of the first two sampling devices can be set to be greater or less than the optimum decision threshold TH3, so that it is possible to obtain statements about the sampling amplitudes which can be utilized for the error correction (soft decision).

FIG. 6 shows a further variant of the data regenerator, in which the first sampling device A1 has two data paths E1, A11, A12 and E1, A21, A22, respectively. The identically constructed second sampling device A2 is illustrated in a simplified fashion. As before, the binary input signal is passed via decision stages E1 and E2 and then sampled bit by bit alternately with the negative and positive edges of the clock signal. The clock signals for the two sampling devices can be adjusted separately via the delay elements TV1, TV2.

The phase comparator can be embodied as desired; it also can be designed as a further sampling device in accordance with FIG. 5. In addition to the occurrence of lower effective data rates, this embodiment with two parallel data paths has the advantage that the data bits to be compared have twice the duration available for the evaluation and can be evaluated even in the event of relatively large phase shifts between binary signal and clock signal. The sampled binary signals AS11 and AS21 of the first data paths and AS12 and AS22 of the second data paths of the two sampling devices are fed via further storage stages L11, L12, L31, L32; L21, L22, L41, L42 as stored signals AS110, AS210, AS120, AS220 to comparison stages V1 and V2, respectively, which output the comparison values VW11 and VW12, respectively. The controller is essentially identical. Instead of the binary signals, in this case the sampling clock signals TS1 and TS2 are delayed independently of one another via the delay elements TV1, TV2.

The function is explained using the timing diagram illustrated in FIG. 7. The bits of the input signal are identified by numerals. In the operating sampling device, the odd-numbered bits 1, 3, 5, . . . are accepted with the negative edge of the clock signal TS1, and the even-numbered bits 2, 4, . . . with the positive edge. The clock signal TS2 for the second sampling device is delayed by virtually the duration of half a data bit relative to the clock signal TS1. Correspondingly, the bits of the sampled binary signal AS21 thereof are delayed relative to AS11. All the sampled bits are accepted into the storage stages L11, L12 or with L31, L32 with the clock signal TS3 (or the inverted clock signal with respect thereto), sometimes the negative edges and sometimes the positive edges being effective. The stored signals AS110 to AS220 are illustrated. As can be seen from the timing diagram, the clock signals TS1 and TS2 can be shifted right up to the limits of the data bits without problems arising in the comparison of the sampled bits. The sampled binary signals AS11, AS12, AS21 and AS22 can even be shifted by ±1 bit relative to the third clock signal TS3 (which is of interest only for measurement purposes). The storage flip-flops L11, L12 and L31, L32 supply output signals which are fed to a first comparator V1; the storage flip-flops L21, L22 and L41, L42 supply corresponding output signals of the even-numbered bits which are fed to a second comparator V2. The comparison values VW11 and VW12 are evaluated in a known manner by the controller ST. The comparators V1 and V2 also can be connected directly to the outputs of the sampling flip-flops A11, A12 and A21, A22 if the sampled binary signals are buffer-stored. This clock regenerator is suitable for extremely high data rates.

In order to check the function and assess the transmission quality, distributions of the comparison values can be determined and displayed in a display device AN.

Although the present invention has been described with reference to specific embodiments, those of skill in the art will recognize that changes may be made thereto without departing from the spirit and scope of the invention as set forth in the hereafter appended claims.

The invention claim is:

1. A data regenerator, comprising:
   a phase comparator;
   a clock regenerator, the clock regenerator and the phase comparator serving to recover a clock signal from a binary input signal;
   a controller;
   a first sampling device for sampling the binary input signal, serving as an operating sampling device, having a decision threshold and a sampling time instant which are set by the controller without interfering with the clock signal;
   a second sampling device for sampling the binary input signal, serving as a measurement sampling device, having an independently adjustable sampling time instant and an independently adjustable decision threshold that are varied by the controller without interfering with the clock signal; and
   a comparator circuit connected to the first and second sampling devices for bit-by-bit comparison of sampled binary signals from the first and second sampling devices;
   wherein the controller varies the respective decision thresholds and the sampling time instants of the first and second sampling devices relative to the clock signal, based on the comparison values obtained in the process, and optimizes the decision threshold and the sampling time instant of the first sampling device.

2. A data regenerator as claimed in claim 1, wherein each of the first and second sampling devices includes a series circuit which comprises a decision stage with an adjustable decision threshold, an adjustable delay element and a sampling flip-flop.

3. A data regenerator as claimed in claim 1, wherein at least one of the sampling time instants and the decision threshold of the phase comparative is adjustable.

4. A data regenerator as claimed in claim 2, wherein the phase comparator has approximately a same data propagation time as the first and second sampling devices and is used as an operating sampling device, and the first and second sampling devices are both used as measurement sampling devices, and wherein the data regenerator further comprises:
   an evaluation device to which are fed the sample binary signals from the first and second sampling devices and from the phase comparator;
   a first comparator circuit connected to outputs of both the first sampling device and the phase comparator and outputting a first comparison value; and
   a second comparator circuit connected to outputs of both the second sampling device and the phase comparator and outputting a second comparison value, with the first and second comparison values being fed to the controller.

5. A data regenerator as claimed in claim 4, wherein each of the first and second sampling devices and the phase comparator includes two signal paths in which bits of a binary signal are alternately stored, and the evaluation device includes separate comparator circuits for the mutually corresponding signal paths.

6. A data regenerator as claimed in claim 4, wherein the first and second sampling devices, given optimized sampling, have different decision thresholds which lie above and below an optimized decision threshold of the phase comparator, and binary signals which are sampled bit-by-bit are used for an error correction.

7. A data regenerator as claimed in claim 4, further comprising a display device connected to the controller, wherein the display device visualizes at least one of measured comparison value distributions and occurring comparison value distributions.

* * * * *